No. 699,088. Patented Apr. 29, 1902.
E. KEMPSHALL.
PROCESS OF MANUFACTURING GOLF BALLS.
(Application filed Mar. 12, 1902.)
(No Model.)

Witnesses:
Ralph Lancaster
Fred E. Maynard

Inventor:
Eleazer Kempshall.
By his Attorney,
F. H. Richards.

THE NORRIS PETERS CO., PHOTO-LITHO., WASHINGTON, D. C.

UNITED STATES PATENT OFFICE.

ELEAZER KEMPSHALL, OF BOSTON, MASSACHUSETTS, ASSIGNOR TO THE KEMPSHALL MANUFACTURING COMPANY, A CORPORATION OF NEW JERSEY.

PROCESS OF MANUFACTURING GOLF-BALLS.

SPECIFICATION forming part of Letters Patent No. 699,088, dated April 29, 1902.

Application filed March 12, 1902. Serial No. 97,883. (No model.)

*To all whom it may concern:*

Be it known that I, ELEAZER KEMPSHALL, a citizen of the United States, residing in Boston, in the county of Suffolk and State of Massachusetts, have invented certain new and useful Improvements in Processes of Manufacturing Golf-Balls, of which the following is a specification.

This invention relates to the process of manufacturing playing-bills; and its chief object is to strengthen and improve their covers, so as to adapt them to withstand the severe usage received in the game of golf and other games.

Figure 1:
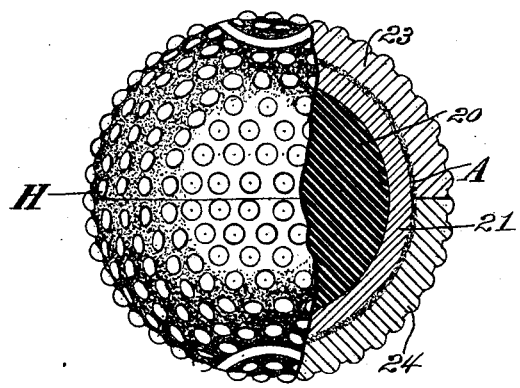
Figure 2:
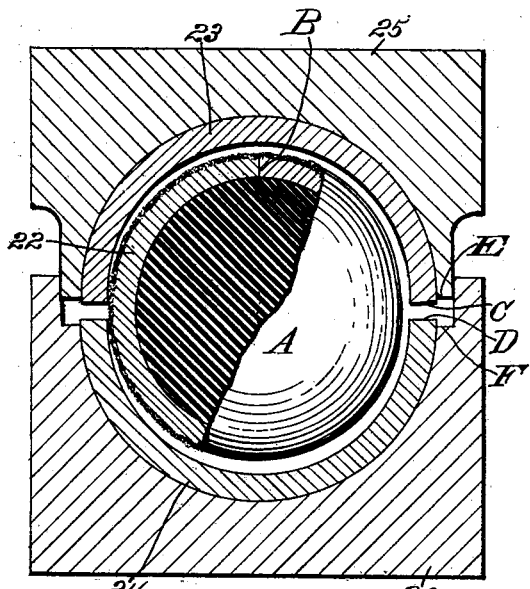

In the accompanying drawings, Figure 1 is a view of my improved ball, partly broken away, so as to exhibit its construction. Fig. 2 illustrates a stage in the process of making the ball, and Fig. 3 illustrates the relative arrangement of layers used in forming the cover.

In the several views similar parts are designated by similar characters of reference.

Figure 3:
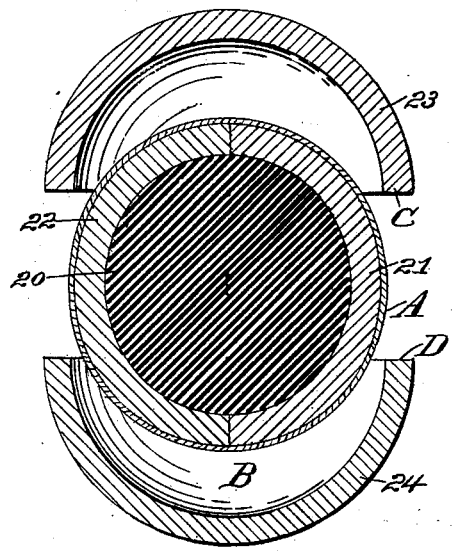

Upon a core 20 of suitable material, such as gutta-percha or soft rubber, I place hemispherical segments 21 and 22 of celluloid, and upon the ball thus formed I apply a coating of material A, as at Figs. 2 and 3, said coating completely enveloping the segments 21 and 22 and consisting of a thick or dense solution of celluloid or a composition thereof which is in such a plastic condition that it may be spread over the core in a substantially even and somewhat thin layer. In practice I find that if this coating is one one-hundreth of an inch, more or less, in thickness it may answer the purpose. The coating is then allowed to dry to a sufficient extent so that it can be handled safely. This drying effects a preliminary seasoning of the coating material. When said coating A has become sufficiently hard, I close the same with an outer shell consisting of hemispherical segments 23 and 24, preferably placing the latter so that the seam B between the inner segments extends transversely and preferably at right angles to the edges C and D of the outer segments. The ball thus formed or assembled I place between heating and forming dies 25 and 26, the edges C and D preferably being parallel with the lips E and F of the dies. The latter I bring together forcibly while heated, thereby closing the outer shell upon the ball and joining the edges of the former. The filling or core 20 may be of a quality of gutta-percha compressible in bulk and may be prepared somewhat oversize—that is, of a bulk somewhat too great for the capacity of the finished shell—and one of the objects of compressing the shell upon the filling is to place the latter in a state of normal compression whether or not said core is reduced in bulk, so as to increase the efficiency of the ball.

The heating of the dies renders the material of the shell layers plastic and enables the edges at B, as well as those at C and D, to weld, and owing to the crossing of the welds the danger of the ball bursting at a weld when subject to rough usage in play is avoided, since the body portion of one of the layers reinforces the weld portion of the other thereof, thereby making a practically indestructible casing for the core. Moreover, the weld itself is improved in character in each layer by reason of the contiguity of the material of the semiplastic layer A, the heating and pressure having a tendency to compact the material of both layers into one concrete thick shell, as at Fig. 1. The pressure to which the shell is subjected tends also to compact, toughen, and temper the celluloid, rendering it less liable to chip off and also more springy, tenacious, and durable. It will also be understood that celluloid in the form of thin layers, which I preferably use, has desirable qualities that are not so well marked when the celluloid is made up in thick layers, so that my laminated shell has the temper of thin celluloid, while also having enough body to furnish the necessary resistance to a blow. The layer A may be otherwise formed and applied, it being desirable that there shall be at least enough solvent present therein to render the outer and inner layers plastic and weldable when heat is applied. The heating of the dies by softening the layers not only insures the kneading or welding thereof into one solid shell, but also facilitates the flowing of the material, so that the shape of the dies is imparted to the finished ball. After being removed from the press the dies may be allowed to cool before the balls are taken out, so that the latter when removed are sufficiently hardened to retain their shape. Thus it will be seen that the ball at Fig. 1 comprises a solid core of gutta-percha, soft rubber, or suitable materials in combination, compressed by a shell built up of three layers of celluloid, the outer and inner layers preferably consisting of segments welded at their edges, the welds preferably crossing, and said layers being caused to weld together or adhere facewise by means of the plastic layer A, thereby producing a shell practically as strong as a seamless shell, and the normal expansive tendency of the filling serving or aiding to maintain the true spherical form of the shell and also aiding materially in restoring the ball to its true shape after a blow, thereby conducing to the flying power thereof. In this manner a thick shell may be produced of highly-seasoned celluloid, thus having the springiness, temper, toughness, and durability of a very thin shell, while being stronger than the latter and firmly compressing the core. Moreover, by having the core in a state of initial compression less distortion of the ball under a blow occurs before the limit of compression is reached, whereby less force is wasted in changing and restoring the shape to the ball, so that nearly all of the force of the implement is utilized in speeding the ball. In the course of time the shell shrinks, thereby cramping the core still more, the strength of the shell being sufficient to prevent bursting as it shrinks, and the playing qualities of the ball being enhanced by the tense or strained condition of both core and shell. It will also be seen that one principal layer of the shell preferably serves to reinforce the joint of the other thereof, and it will be understood that such reinforcement not only enables the shell to withstand the normal expansive energy of the filling, but also prevents undue flexure and practically eliminates the danger of bursting at the joint.

I usually form the shell of golf-balls with a pebbled or brambled surface, as at H; but for other games the balls may be made with a smooth periphery.

I have illustrated the core 20 in the form of a solid sphere; but it may be otherwise formed and still be cramped or held under compression by the improved shell. I prefer to employ gutta-percha for at least a large portion of said core, although any other yielding backing may be employed for the shell, reducing the tendency of the latter to chip and also coöperating therewith to increase the efficiency of the ball. The shell possesses a degree of flexibility, springiness, or temper not present in a solid or nearly solid ball of celluloid, thus preserving the wear-resisting quality of the ball while making it lively and efficient.

One important advantage of my celluloid shell resides in its quality of retaining its original color throughout all the severe usage which it receives in a game. Another advantage resides in its springiness, so that it is of material value in imparting liveliness to the ball or increasing its flying or driving power. It imparts to the ball a solidity, stiffness, and springiness which it has heretofore been found impracticable to secure. My compressed core gives the shell a good backing at all points and tends to prevent such indentations of the shell by an implement as would cause the shell to crack. My celluloid shell is not only practically indestructible, but is at the same time so smooth that it offers little resistance to the air in its flight and drives farther than any ball heretofore produced, while on account of its slipperness it easily passes through the grass and is hence excellently adapted to the game. My shell overcomes the defect of prior golf-balls of being easily cut by a blow from an implement. It is practically indestructible from such causes. It cannot be knocked out of shape, as is the case with former golf-balls. It does not succumb to the heat of the hottest summer day, whereas other golf-balls are softened and spoiled by warm weather.

It will be understood that the resistance of the central mass at the compressing operation furnishes a substantial support for sustaining the relatively thin shell against the pressure of the forming-dies and coöperates with the latter in producing the desired density or firm, tough, and springy texture of the shell.

In using the term "celluloid" I refer to celluloid compounds generally and do not limit myself to any particular variety of such compound nor to any particular grade or mixture of celluloid composition.

Variations in construction, method, and other particulars may be resorted to within the scope of my present improvements.

Having described my invention, I claim—

1. A process in producing a playing-ball, consisting in inclosing a sphere of springy material in previously-formed spherical segments of plastic material, coating said segments with a cementing-coat, placing over said coating an outer layer of spherical segments, bringing said layers to a plastic condition, and subjecting the whole to compression.

2. A process in producing a playing-ball, consisting in inclosing a sphere of springy material in previously-formed spherical segments of plastic material, coating said segments with a cementing-coat, said segments being so placed that the joint in one layer runs crosswise of the joint in the other layer, bringing said layers to a plastic condition, and subjecting the whole to compression.

3. A process in producing a playing-ball, consisting in inclosing a sphere of springy materal in |previously-formed spherical segments of seasoned celluloid, coating said segments with a layer of green celluloid, allowing said coating to harden so that it can be handled, placing over said coating an outer layer consisting of spherical segments of celluloid, heating said layers, and subjecting the whole to compression.

4. A process in producing a playing-ball, consisting in inclosing a sphere of springy material in previously-formed spherical segments of seasoned celluloid, coating said segments with a layer of green celluloid, allowing said coating to harden so that it can be handled, placing over said coating an outer layer consisting of spherical segments of celluloid, heating said layers, subjecting the whole to compression, and maintaining the compression while the shell cools and hardens.

5. A process in producing a playing-ball, consisting in inclosing a sphere of springy material in previously-formed spherical segments of seasoned celluloid, coating said segments with a layer of green celluloid, allowing said coating to harden so that it can be handled, placing over said coating an outer layer consisting of spherical segments of celluloid, the joint or seam in one layer running crosswise of the joint or seam in the other layer, heating said layers, and subjecting the whole to compression.

6. A process in producing a playing-ball, consisting in forming hemispherical segments of celluloid, placing said segments upon a sphere of gutta-percha, so as to form a plurality of layers, the joint or seam in one layer crossing a joint or seam in another layer, placing an incompletely-cured coating of celluloid between said layers, subjecting the whole to heat and compression to an extent to compress said core, and maintaining the compression while the shell cools and hardens.

ELEAZER KEMPSHALL.

Witnesses:
B. C. STICKNEY,
JOHN O. SEIFERT.